United States Patent [19]
Beyer

[11] Patent Number: 4,468,341
[45] Date of Patent: Aug. 28, 1984

[54] STABLE PURIFIED AQUEOUS SOLUTIONS OF FLUORESCENT WHITENING AGENT

[75] Inventor: Bryan Beyer, Mobile, Ala.

[73] Assignee: Ciba-Geigy Corporation, Ardsley, N.Y.

[21] Appl. No.: 546,149

[22] Filed: Oct. 27, 1983

[51] Int. Cl.³ ............................................. C09K 11/06
[52] U.S. Cl. ............................ 252/301.23; 544/193.2
[58] Field of Search .................. 252/301.23; 542/461; 544/198

[56]  References Cited
U.S. PATENT DOCUMENTS

| 3,676,139 | 7/1972 | Amano et al. | 542/461 |
|---|---|---|---|
| 3,766,083 | 10/1973 | Langstroth | 542/461 |
| 3,853,583 | 12/1974 | Langstroth | 542/461 |
| 3,925,260 | 12/1975 | Tscharner | 542/461 |
| 3,951,965 | 4/1976 | Mengler et al. | 252/301.23 |
| 4,024,071 | 5/1977 | Frigeli | 252/301.23 |
| 4,112,226 | 9/1978 | Eymond | 542/461 |
| 4,216,111 | 8/1980 | Thompson | 542/461 |
| 4,252,604 | 2/1981 | Fleck et al. | 252/301.23 |

*Primary Examiner*—Arthur P. Demers
*Attorney, Agent, or Firm*—Karl F. Jorda

[57] ABSTRACT

A process for the preparation of a stable aqueous solution of the tetrasodium salt of 4,4'-bis(4-p-sulfo-anilino-6-diisopropanolamino-s-triazin-2-ylamino)-2,2'-stilbenedisulfonic acid is disclosed. The resultant solution is substantially free from destabilizing organic impurities and destabilizing inorganic salts. In the absence of these destabilizing materials the solution does not require the co-solvents of the prior art.

10 Claims, No Drawings

4,468,341

STABLE PURIFIED AQUEOUS SOLUTIONS OF FLUORESCENT WHITENING AGENT

FIELD OF THE INVENTION

This invention relates to a process for the manufacture of the fluorescent whitening agent, 4,4'-bis(4-p-sulfoanilino-6-diisopropanolamino-S-triazin-2-ylamino)-2,2'-stilbenedisulfonic acid tetrasodium salt and preparations containing same for use in textile treatment.

BACKGROUND OF THE INVENTION

The compound 4,4'-bis(4-p-sulfoanilino-6-isopropanolamino-s-triazin-2-ylamino)-2,2'-stilbenedisulfonic acid tetrasodium salt is one of the preferred fluorescent whitening agents, also known as optical brighteners. Brighteners are particularly useful for application to cellulosic fibers such as papers and textiles for imparting improved appearance.

The specific brightener, 4,4'-bis(4-p-sulfoanilino-6-isopropanolamino-s-triazin-2-ylamino)-2,2'-stilbenedisulfonic acid tetrasodium salt, is particularly useful for textiles that have been impregnated with thermosetting resins conventionally used for imparting wash and wear qualities and crease resistance to fabrics.

A prime advantage of this compound is that it can be applied simultaneously with these resins to the textile substrates. However, the brightener preparations resulting from previous methods of synthesis either contained interfering impurities or were not sufficiently stable for uniform application.

Bis-triazinyl stilbenedisulfonic acid-based fluorescent whitening agents (FWA) have been known since about 1940 (Alien Property Custodian Specification Ser. No. 381,856, published May 11, 1943). Various of these FWA have been synthesized and selected industrially based upon their affinities to specific substrates or to agents used for impregnating or coating specific cellulosic substrates or matrices.

British Pat. No. 896,533 (1962) to Sandoz taught the whitening of paper with the subject FWA in solution or suspension due to its miscibility with sizes used in paper manufacture. In this reference other FWA's in aqueous solution are specifically taught to be useful in whitening cotton textiles.

U.S. Pat. No. 3,532,692, issued Oct. 6, 1970, teaches that the p-sulfoanilino and diisopropanolamino are preferred substituents on the bis-triazinyl stilbenedisulfonic acid matrix but does not specifically mention the subject FWA of this invention in its description of the invention therein. That invention was directed to the manufacture of FWA by condensation of appropriate stilbenes with cyanuric chloride in strongly acidic aqueous media.

U.S. Pat. Nos. 3,239,513 and 3,360,479, assigned to Geigy and based on a 1959 Swiss patent application, teach fluorescent whitening agents having amine substitutents, similar but not identical, and are not symmetrical. Instead of diisopropylamine, N-alkyl alkanolamine or N-alkyl alkandiolamine are taught. They are noted to have high affinity for aluminum salts, sulfates and silicates used as paper fillers. The latter patent teaches stabilization of solutions of these optical brightening agents by the use of organic solubility promoters to ensure uniform distribution of the brightening agent during use. The concommitant use of synthetic resins in the paper is also taught. Thus, the preparation of a resin-reinforced, felted fabric containing FWA(optical brightener) maintained in aqueous solution by the use of co-solvents during impregnation is well disclosed.

U.S. Pat. No. 3,766,083 issued Oct. 16, 1973 teaches the specific FWA of this invention as a fluorescent whitening agent for whitening cellulosic fibers concommitantly with their treatment with conventional termosetting textile resins and is also directed to the stabilization of the aqueous solution of the specific FWA by the addition thereto of a co-solvent. While the use of the cosolvent facilitates uniform application of the FWA, these materials also weaken (or plasticize) the polymer chains and their substantivity to the cellulosic fibers.

Investigation into the use of the FWA solutions shows that the pure specific FWA agent does not destabilize in aqueous solution. Certain unidentified organic impurities, found on HPLC chromatography, as well as residual salt formed during synthesis of the FWA cause the destabilization with haziness of solution, precipitation of solution contents and non-uniform deposition on the fibers as well as impurity of the color of the deposited FWA pigment.

THE INVENTION

The present invention is based upon a novel synthesis of the tetra sodium salt of 4,4'-bis(4-p-sulfoanilino-6-diisopropanolamino-s-triazin-2-ylamino)-2,2'-stilbenedisulfonic acid of the formula

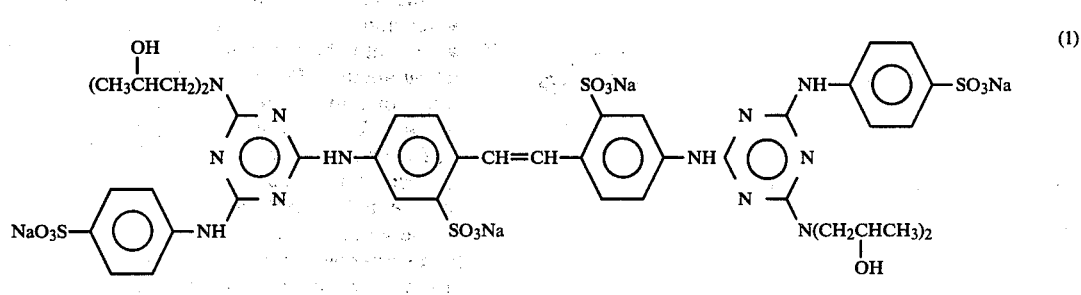

which permits removal of the residual salt below about 12% (dry basis) and during such salt removal also rids the product of the interfering organic impurities.

The process of this invention provides 4,4'-bis(4-p-sulfoanilino-6-isopropylamino-s-triazin-2-ylamino)-2,2'-stilbenedisulfonic acid tetrasodium salt of the formula

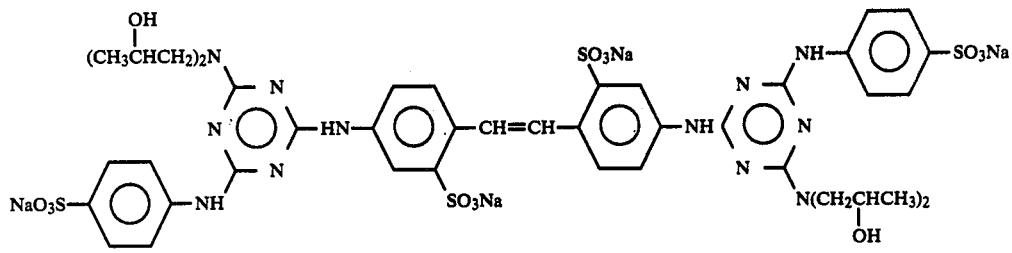

in stable form, free from cosolvents, which comprises the steps of condensing two moles of cyanuric chloride with one mole of 4,4'-diamino stilbene 2,2'-disulfonic acid to form a first intermediate, bis-3,5-dichloro-s-triazin-2-stilbene disulfonic acid sodium salt according to Equation I

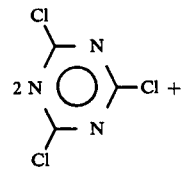

Cyanuric Chloride

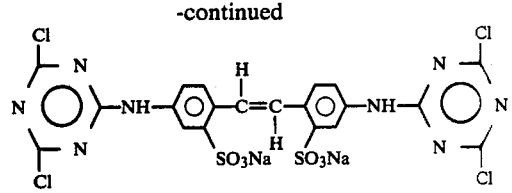

Intermediate (I)

This first intermediate is then reacted with two moles of p-sulfanilic acid sodium salt to form a second intermediate, 4,4'-bis(4-p-sulfoanilino-6-chloro-s-triazin)-2,2'-stilbenedisulfonic acid sodium salt, according to Equation II

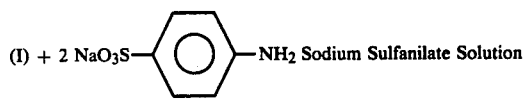

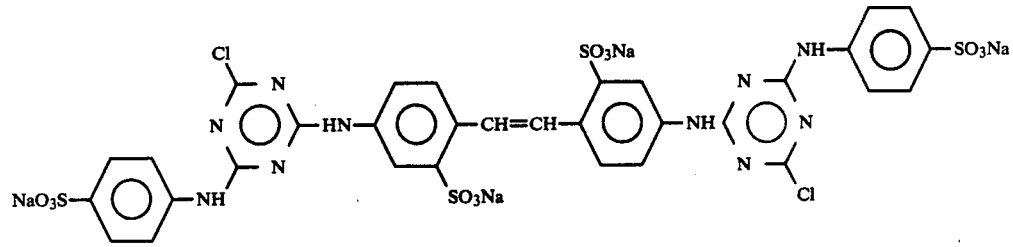

Intermediate (II)

(CC) M.W. 184

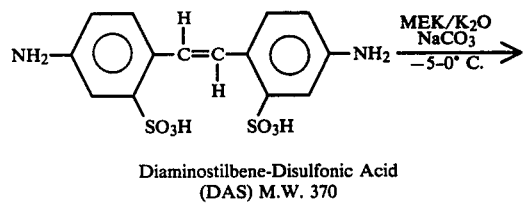

Diaminostilbene-Disulfonic Acid
(DAS) M.W. 370

This second intermediate is only partially soluble in water and the precipitate thereof is then washed with water until the salt content of the cake is reduced to below about 12% (weight on a dry basis). It has been noted that this aqueous leaching step also reduces to below 3.5% an impurity which has been noted by HPLC on an ultrasphere column. (Before washing, this impurity was noted in concentrations above about 8% and yielded unstable products).

The washed precipitate of the second intermediate is then suspended in water, heated, and reacted with two moles of diisoproanolamine to form the fluorescent optical whitening agent (1), (with less than 3.5% of the destabilizing impurity and less than 12% salt (NaCl)) according to Equation III.

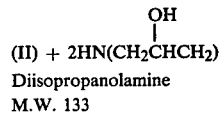

Diisopropanolamine
M.W. 133

-continued

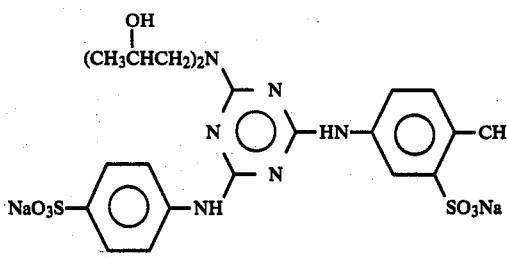 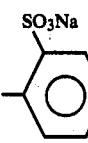  III m.w. 1,221

While the sodium salts are the preferred salts for these reactions and the product, it is also practicable to utilize any of the alkali metal salts, particularly the potassium salts.

DETAILED DESCRIPTION

The preferred fluorescent whitening agent of this invention has the formula (1) above and is industrially sold in aqueous solution containing from 20 to 25 wt.% solids with the FWA of formula (a) at above 90° wt.% of said solids.

By the above described process, more fully detailed in the conditions described below and in the appended examples, tonnage batches have been prepared in yields, based on starting materials, better than 90%.

In the condensation reaction between the cyanuric chloride and the diaminostilbene disulfonic acid, the reaction medium may be a solution of the reactants in a reaction medium of methylethyl ketone and water. A 3:2 proportion is satisfactory but the ketone is not absolutely necessary. Water alone may be used but the rate of the reaction is slowed and additional impurities may form.

The methylethyl ketone may be replaced by other inexpensive solvents such as acetone and other low boiling ketones, lower aliphatic alcohols such as methyl to isopropyl alcohols, lower aldehydes, liquid aliphatic hydrocarbons and low boiling halogenated hydrocarbons. The inexpensive solvents need not be water-miscibility is preferred as long as the partition co-efficient between the reactants, products, and the water phase is sufficient to promote the reaction).

The reaction of equation I, when performed in solution, is carried out at media temperatures of about 0° to 5° C. and at pH ranging from about 4.5 to 7.5. The pH is maintained by the addition of either sodium carbonate or sodium hydroxide. The reaction temperature is maintained by refrigeration or the addition of coolants, such as dry ice/acetone slurry, to the reaction mixture.

The reaction of equation I may also be conducted by a continuous condensation of molten cyanuric chloride and sodium salt solution of diaminostilbene disulfonic acid and subsequent conversion to the sodium salt of the first intermediate by reaction with sodium carbonate.

The first intermediate from either the molten state reaction or from the powdered reactants dissolved in the reaction medium is then mixed with the sulfonilic acid sodium salt solution in water as per equation II. The mixture is heated to about 50° C. The pH of the reaction mixture is maintained at about neutrality (7.5-8) by NaOH. The reaction is completed in about 30 to 60 minutes at 50° C. Sodium sulfate or sodium chloride is added to facilitate precipitation of the insoluble second intermediate. The slurry is then heated and the preferred solvent, MEK is stripped to about 98° C. The solvent is recovered. When stripping is complete, 98° C., the slurry is cooled to about 10° to 20° C. and then filtered. The filter cake is washed with water or dilute NaCl to facilitate salting out and salt removal. The washing is followed by HPLC until the salt content is below about 12% (dry basis) preferably about 3.5% and the amount of destabilizing impurity is less than 3.5% (dry basis) preferably less than 1% by HPLC.

The washed filter cake is then suspended in water. The suspension is heated to about 90° C. and 2 mols of diisopropanolamine is rapidly added. The reaction medium has a pH of about 9.0 to 9.5 at which pH the product forms and dissolves. After about two hours at 90° C., solution of the product is complete. The solution is cooled to about 30°-40° C. and filtered. The filtrate is adjusted to an optical density of 0.42±0.02 (the preferred industrial concentration), by the addition of water.

For commercial acceptance, the solution should be a clear amber liquid that is free from precipitation, even after aging tests including at least three freeze-thaw cycles (0°/25°). The solution should have a pH of 9.5±0.5 and a Gardiner color of 9-13.

The optical density should be 50 ppm=0.425±0.021 at 350 nm

Such a product when applied in combination with standard resin finishes will fully meet the industrial standard as regards shade. In addition, the shade after standard aging tests will be within acceptable limits.

EXAMPLE 1

Into a 3-liter reactor fitted with a thermometer, heating and cooling capacity, dropping funnel, pH meter, and condenser set-up, charge 300 ml of methyl ethylketone (88%) and 200 ml of water. The reaction mixture is cooled to 0° C. and charged with 50 grams of powdered cyanuric chloride. To the reactor is added 500 grams of 10% aqueous solution of 4,4'-diaminostilbene-2,2'-disulfonic acid to a positive spot test while maintaining the mixture at 0° C. and adjusting the pH in the range 5-6.5 by the addition of sodium carbonate.

When this reaction is complete, as indicated by the spot test, add 46.3 grams of sulfanilic acid, 100% as a 17% wt/wt sodium salt solution. Heat the reaction mixture to 50° C. and maintain its pH 7.5-8.0 by addition of 50% NaOH. Hold for 30 minutes and add 80 gm of Na$_2$SO$_4$. Start heating the mixture to strip the MEK. At 98° C. stripping is complete and cool the resultant slurry to 20° C. Filter the slurry and wash with 100 grams 5% NaCl solution. Wash with water till HPLC shows the impurity level to be below 3.5%.

Charge the reactor with 300 grams H$_2$O and the washed wet cake. Heat to 90° C. and charge 37 grams diisopropanolamine. Hold at 90° C. pH 9.5± for about 2

EXAMPLE 2

Charge to reaction vessel 946 gal. of water and turn on agitator and pump and circulate. Charge 1,947 lbs. of sodium carbonate from bags. Maintain temperature in vessel at 40°–45° C. during the entire time the carbonate solution is held in the vessel. Charge 1,050 gallons of methyl ethyl ketone to vessel. When the MEK has cooled to 0° C., leave the brine valves on to the reactor coils. Charge 4,280 lbs. of ice. Temperature should drop to −8° C. or below. The batch pH is checked at this point with the narrow range pH paper 3.0–5.5. The temperature of the DAS from storage should be in the range of 20°–25° C. Turn the agitator on high speed. Start the addition of approximately 220 gallons of sodium carbonate (as approximately 460 pounds 100% as a 25% wt./vol solution). Specific amount to be added will be dependent upon the pH control between pH 5 and 6. When the pH of the batch reaches pH 5.0–5.5, charge 1,550 lbs. 100% DAS. Run an DAS spot test immediately after the previous step. The temperature should not be less than 0° C. and the pH should be between 4.5–5.5. The pH of the reactor mixture is maintained at pH 5.0–5.5 with the addition of small amounts of carbonate solution until a faint purple DAS spot test is achieved. pH must be in range of 5.5 to 7.0. If a dark DAS spot test is observed, hold the temperature at 0° C. to +5° C. and agitate for 5 minutes. After the 5 minute period take another spot test. Return the agitator to slow speed. Blow the brine out of the coils. Charge 1,496 lbs. of sodium sulfanilate solution. The solution has an assay of about 17.0% wt/wt free acid. Charge correct amount according to assay. Charge should be done as fast as possible. Bring the pH up to 7.5–8.0 with caustic. Heat the batch by coil heating to 50° C. over a 20–30 minute period. When the pH approaches 7.6 switch the pH control unit to automatic. Maintain the pH at 7.5–8.0 with approximately 710 lbs. of 50% sodium hydroxide. Hold the temperature at 50° C. for ½ hour. Do not begin the ½ hour hold period until the pH has stabilized. Pull a sample at the end of the ½ hour hold period and note if crystals are forming. Check pH to insure a pH of 8.0. Heat up to 55°–60° C. Close the NaOH block valve and remove the pH probe and charge 2,500 lbs. of sodium chloride. Allow approximately 15 minutes for crystallization. Set the dial on the instrument panel to 40–50% and begin stripping MEK. When the temperature reaches 95° C., cut the steam off. As soon as the temperature levels out (96°–99° C.), blow the steam from the coils and put brine on. Start the brine flow at 30–40 on the dial. At 70°–75° C. hold for 15 minutes, then cool down to 25° C. with brine. Filter with the filter press.

Charge 1,150 gallons of water. Turn agitator on slow speed. Heat the water to 45°–50° C. Charge the intermediate wet cake. Using a portable pump, charge 1,232 pounds of diisopropanolamine (at 45°–50° C.). Adjust the pH to 9.0–9.5 with 50% caustic as soon as it is below 9.0. Continue heating the batch to 90° C. Hold at this temperature for 1–2 hours. Maintain during the heatup period and during the hold a pH of 9.0–9.5 with caustic 50%. Begin cooling the batch to 40° C. Precoat the Durco using fresh water in the precoat tank and 12 pounds of Hyflo Supercel. The water remaining in the Durco may be used as dilution water for the batch. When the vessel temperature reaches 45° C. begin circulating through the Durco, and after ½ hour, have a sample tested for optical density. Continue to circulate the batch through the Durco Filter. Yield: 29,600 pounds of material with an O.D. of 0.42.

What is claimed is:

1. A process for preparing the fluorescent whitening agent, 4,4'-bis(4-p-sulfoanilino-6-diisopropanolamino-s-triazin-2-ylamino)-2,2'-stilbenedisulfonic acid tetra sodium salt, in stable form without cosolvents which comprises the steps of
   (a) condensing substantially two mols of cyanuric chloride with one mol of an alkali metal salt of 4,4'-diaminostilbene-2,2'-disulfonic acid to form a first intermediate, bis-3,5-dichloro-s-triazin-2-stilbene disulfonic acid alkali metal salt;
   (b) reacting said first intermediate with two mols of p-sulfanilic acid alkali metal salt to form a second intermediate, 4,4'-bis(4-p-sulfoanilino-6-chloro-s-triazin)-2,2'-stilbenedisulfonic acid tetraalkali metal salt, as a precipitate;
   (c) washing said precipitate to reduce the content of inorganic salts therein; and
   (d) converting said second intermediate to said fluorescent whitening agent by heating said precipitate in water with substantially two mols of diisopropanolamine in water to form an aqueous solution of said fluorescent whitening agent product.

2. The process according to claim 1 wherein the condensation reaction (a) is carried out in the presence of water as the reaction medium at a pH in the range 4 to 10.

3. The process according to claim 2 wherein said reaction medium additionally includes solvents selected from the group consisting of ketones, aliphatic lower alcohols, lower aldehydes, liquid aliphatic hydrocarbons and halogenated hydrocarbons, soluble or insoluble in said water.

4. The process according to claim 3 wherein said added solvent is methyl ethyl ketone.

5. The process according to claim 1 wherein said condensation (a) between said cyanuric chloride and said aminostilbene as reactants is carried out with said reactants introduced in powdered form.

6. The process according to claim 1 wherein said condensation (a) between said cyanuric chloride and said aminostilbene, as reactants, is carried out with at least one of said reactants introduced in molten form.

7. The process according to claim 1 wherein said second intermediate is washed with water until the inorganic salt content is reduced below about 12% dry weight of said precipitate.

8. The process according to claim 1 wherein said aqueous solution of said product is in the range pH 9–10.

9. The process according to claim 8 wherein the pH is adjusted to about 9.5±0.5 and optical density 0.425±0.021 at 350 nm.

10. The process according to claim 1 wherein said alkali metal salts are sodium salts.

* * * * *